United States Patent [19]

McWilliams et al.

[11] Patent Number: 5,080,744
[45] Date of Patent: Jan. 14, 1992

[54] PROCESS TO PRODUCE A COVER FOR A UTILITY METER REGISTER

[75] Inventors: William H. McWilliams, Pittsburgh, Pa.; Charles L. Hamermesh, Malibu, Calif.; Evan B. Welch, Medway, Mass.

[73] Assignee: M&FC Holding Co., Inc., Wilmington, Del.

[21] Appl. No.: 353,872

[22] Filed: May 18, 1989

[51] Int. Cl.[5] .............................. B29C 51/14
[52] U.S. Cl. .................... 156/245; 156/385; 428/900
[58] Field of Search ............... 156/245, 285; 428/900

[56] References Cited

U.S. PATENT DOCUMENTS

| | | |
|---|---|---|
| 3,013,922 | 12/1961 | Fisher . |
| 3,549,477 | 12/1970 | Burgman .................. 156/245 |
| 3,703,425 | 11/1972 | Delmonte et al. . |
| 3,726,754 | 4/1973 | Coglianese et al. . |
| 3,801,244 | 4/1974 | Eisenberg . |
| 4,053,545 | 10/1977 | Fay . |
| 4,107,391 | 8/1978 | Moore et al. . |
| 4,121,014 | 10/1978 | Shaffer . |
| 4,242,414 | 12/1980 | McKenzie . |
| 4,301,212 | 11/1981 | Cohnen et al. . |
| 4,384,026 | 5/1983 | Moore et al. . |
| 4,405,679 | 9/1983 | Fujioka et al. . |
| 4,475,241 | 10/1984 | Mueller et al. . |
| 4,491,508 | 1/1985 | Olson et al. . |
| 4,513,037 | 4/1985 | Collins . |
| 4,668,588 | 5/1987 | Kishima . |
| 4,692,402 | 9/1987 | Bouldin et al. ................. 428/900 |
| 4,803,484 | 2/1989 | Schutrum et al. . |

Primary Examiner—Caleb Weston
Attorney, Agent, or Firm—Lorusso & Loud

[57] ABSTRACT

An improved plastic laminated structure, a method to make that structure and use of that structure as a cover for a moisture-resistant electronic utility meter register. The structure is formed by providing a plastic layer to which is laminated on one side by means of an adhesive a water vapor barrier film of polychlorotrifluoroethylene.

4 Claims, 2 Drawing Sheets

PROCESS TO PRODUCE A COVER FOR A UTILITY METER REGISTER

BACKGROUND OF THE INVENTION

This invention relates generally to an improved laminated plastic construction particularly suitable for incorporation into utility meters with sealed metal and plastic lens register enclosures.

Plastic has replaced glass in a variety of situations, because it can be molded easily, can provide a clear surface similar to glass and because it is more resistant to breakage. A problem with the replacement of glass by plastic in some situations is that plastic has a high water vapor and gas vapor transmission rate as compared to glass. This problem is particularly problematic when the plastic is used to enclose or protect components that will be damaged by the water or gas.

Common residential utility meters (water, gas and electric) are often mounted outside the residence so that meter readers can obtain consumption readings without entering the home. This presents a particular problem for water meters since the measured product, water, can freeze in all but very tropical climates causing frost damage to the meter and connected piping. Common practice to solve this problem is to mount the water meter in a meter box pit below the frost line where the meter can be protected from freezing.

While warm convection air currents help prevent freezing in very cold weather, in warmer weather these pits are often hotter than ambient air. These meter boxes are not sealed; thus ground water often fills the pit. As a result of these factors, the meter box is a hot, moist environment for several months of the year, especially in much of North America.

While this environment does not present any unusual problems for standard meters with sealed metal and glass lens register enclosures, in a typical modern electronic type meter, a clear plastic cover is substituted for the glass lenses. Plastic is considered superior because it permits close dimensional fitting bosses and terminal penetrations to be molded in with the parts, an arrangement not possible with glass production. A clear plastic is needed to enable meter readers to check the mechanical odometer reading against the electronic reading at established intervals of from one year to three years; it is also needed to in-test as received meters. A high impact plastic is also required because of the rough service associated with the in-ground use. A natural choice for this application has been polycarbonate. Commonly used polycarbonates are Merlon, a trademark of Mobay Chemical Company of Pittsburgh, Pa. for a polycarbonate resin, and LEXAN, a trademark of General Electric Company, Polymers Product Department of Pittsfield, Mass., for a thermoplastic carbonate-linked polymer.

Although polycarbonate has the advantages described above, a high moisture vapor transmission rate is an offsetting poor physical property. The consequence of using a polycarbonate cover is that the driving potential of high humidity and temperature eventually permits moisture to permeate the cover causing moisture saturation of the register internals and especially the electronic circuitry. Moisture on low voltage microcircuits will eventually cause catastrophic shorts and/or lead corrosion. Conformal coatings of the electronic circuitry can provide an improved measure of moisture resistance. However, a typical electronic utility meter register contains a contact type, rotating encoder mechanism which consists of a small brush wiper which makes electrical connection with ten segment commutator pads to accomplish the encoding. This required movement defeats the ability to protect all of the circuitry with moisture-resistant coatings.

The actual process and amount of water vapor transmission through a polycarbonate cover is primarily a function of three items, (1) the lens thickness (2) the lens surface area and (3) the lens material's vapor transmission rate. Since the utility meter's electronic register is tooled and the meter's register bonnet is also reasonably fixed in dimensions, the geometry of the register enclosure envelope (items (1) and (2) above) preferably should not be altered dramatically.

Assuming that the particular geometry is fixed, moisture vapor saturation of the internal volume of the electronic register can take place in three or four days in the presence of a high driving potential (high ambient temperature an pits that are wet from lawn irrigation, tidal action, and rain, for example). To adequately protect the meter's electronic circuitry, a two order of magnitude improvement in the water vapor transmission rate is needed in the cover material construction.

Accordingly, it is an object of the present invention to provide a laminated plastic construction with superior moisture barrier properties.

It is another object of the present invention to provide a cover for an electronic utility meter of a laminated plastic with superior moisture barrier properties.

A further object of the present invention is to provide a laminated moisture barrier plastic structure as a cover for an electronic utility meter.

Still another object of the present invention is to provide a laminated moisture resistant plastic cover for an electronic water meter to overcome the source of failure of these meters at the present time.

Yet another object of the present invention is to provide laminated plastic structures that exhibit improved gas barrier properties and improved resistance to hydrolysis and attack by caustic agents.

SUMMARY OF THE INVENTION

The present invention is an improved plastic laminated structure, a method to make that structure and use of that structure as a cover for a moisture resistant electronic utility meter register The structure is formed by providing a plastic layer to which is laminated on one side by means of an adhesive a water vapor resistant film of polychlorotrifluoroethylene (PCTFE).

In its preferred embodiment for use as a cover for a utility meter register, the plastic cover is molded to its conventional shape for the utility meter register A polychlorotrifluoroethylene (PCTFE) film is vacuum thermoformed to a shape corresponding to the interior of the plastic member. The two layers are assembled and an adhesive is applied between the thermoformed film and the polycarbonate cover. The layers are squeezed together and the excess film is trimmed. The adhesive is then cured. The edges of the film are trimmed to fit closely to the outside diameter of the plastic molding.

The present invention will be more fully understood with reference to the following detailed description of the invention, taken together with the drawing in which like reference numbers represent like members throughout the various views.

DETAILED DESCRIPTION OF THE INVENTION

The present invention will be described broadly, with a more detailed description following, as well as a description of a preferred embodiment and use.

It has been discovered that a plastic laminated structure with improved moisture barrier properties can be provided. The plastic structure will be formed from a layer of plastic, approximately 0.06 to 0.25 inches thick, and a layer of polychlorotrifluoroethylene (PCTFE), adhered together by means of an adhesive.

Figure 1:
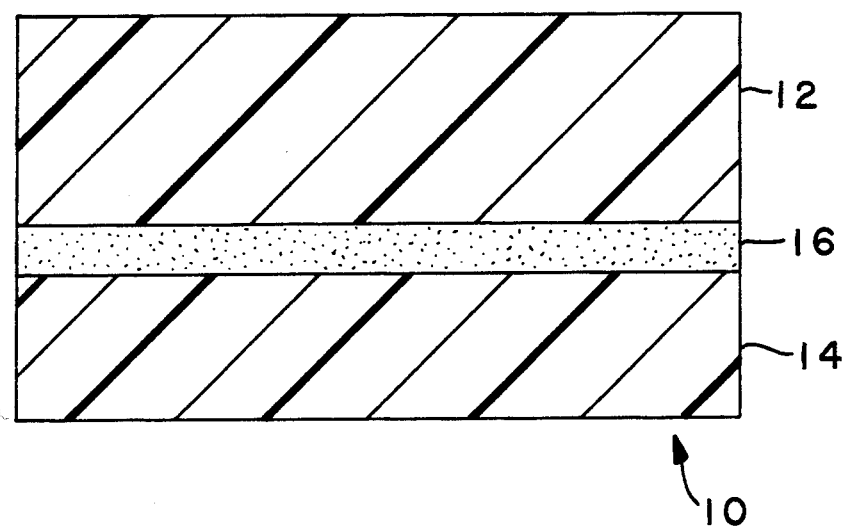
FIG. 1 illustrates the laminate configuration of the present invention.

The laminate configuration 10 of the present invention is shown in FIG. 1. A plastic sheet 12 is bonded to a layer of polychlorotrifluoroethylene (PCTFE) 14 by means of an adhesive layer 16. The finished laminate configuration is moisture resistant and optically clear, and as discussed below, would find utility in a cover for a utility meter with electronic registers as the laminate will protect the electronic internals from moisture, even in a high humidity environment.

The plastics used in the present invention may be any plastic typically used to form a cover for a utility meter. As noted above, a polycarbonate resin is commonly used for this purpose. Other materials, such as a TPX resin, a clear polypropylene film or a polysulfone film may be suitable as well. The cover is formed by conventional methods, and will generally be 0.06 to 0.25 inches in thickness. The polycarbonate resins useful in the practice of the instant invention generally have a number average molecular weight in the range of from about 10,000 to about 60,000. The preferred polycarbonate for use in the present invention is Grade 123-112 LEXAN, a trade name of General Electric Company for a UV-stabilized clear polycarbonate. An alternate material is Macrolon 2503-1112, also a UV-stabilized clear polycarbonate, manufactured by Mobay Chemical Corp., Pittsburgh, Pa.

Polycarbonates and other plastics have several qualities making them suitable replacements for glass in many circumstances; for example, it can be molded to most shapes, it is transparent to provide optimal reading conditions, and it is shatter and breakage resistant. Unfortunately, polycarbonates are water and moisture permeable and accordingly, without modification, are unsuitable for many applications.

To overcome that disadvantage, in the present invention a layer of a material for moisture resistance to water vapor permeation is laminated to one side of the polycarbonate layer. In choosing a material for moisture resistance, the following considerations must be noted. The material must have a high resistance to water vapor permeation. In addition, the material must be able to be processed into some form which would permit it to function, in the preferred embodiment of this invention, as a register cover or allow it to be unobtrusively installed in an existing plastic register cover. The material has to be transparent and crystal clarity is essential in order that the register can be visually read.

In addition, the material must be resistant to breakdown under register operating conditions, and should not give off any decomposition products which might attack either the register internals or the plastic cover. Suitable materials would be Saranex, a tradename of Dow Chemical of Midland, Mich. for a polyvinyl dichloride shrink film, Clysar LLP, a tradename of E. I. DuPont de Nemours of Wilmington, Delaware for a polyolefin shrink film, Clysar EHC, a tradename of E. I. DuPont de Nemours for a co-polymer shrink film, Teflon, a trademark of E. I. DuPont de Nemours for a tetrafluoroethylene fluorocarbon polymer extruded film, DARAN 112, a tradename of W. R. Grace & Co, Organic Chemicals Division, Lexington, Massachusetts for a polyvinyl dichloride emulsion coating, DARAN 8680, a tradename of W. R. Grace & Co. for a polyvinyl dichloride emulsion coating, TS-3693-44, a trade name of the Lord Corporation for a UV-curable coating, IC-5050-55, a tradename for the Lord Corporation for a UV-curable coating, TPX, a tradename of Mitsui Industries of Japan for an injection-moldable clear resin. In a preferred embodiment the moisture resistant material will be ACLAR, a trademark of Allied Chemical Corporation of Morristown, N.J. for a series of fluorohalocarbon films, which has useful properties ranging from $-200°$ to $+198°$ C. The preferred film is ACLAR 33C, a terpolymer film consisting primarily of polychlorotrifluoroethylene (PCTFE). The material thermoforms satisfactorily on equipment having a preheat station and a plug assist system. ACLAR 33C provides superior moisture barrier properties and is generally available in standard thicknesses of .00075", .001", .002", .003", .005", and .0075". The .0075" thick sheet is best suited for the purposes of the present invention.

The plastic layer and the moisture resistant material layer must be joined to form the moisture resistant plastic laminated product. In choosing an adhesive, the strength of the bond to both substrates, the optical clarity of the finished assembly, and the practicality of use on a production basis are important factors. In the preferred embodiment with the ACLAR 33C film, the first consideration, that of bond strength, limited the range of products to be considered for ACLAR 33C is a polychlorotrifluoroethylene film which makes activation of the surface extremely difficult. Suitable adhesives are the Light-Weld UV-curing adhesives, a trademark of the DYMAX Engineering Adhesives Company of Torrington, Conn. for polyurethane oligomer blend adhesives. Especially suitable are DYMAX Light-Weld 186, 20218 and 489 which show excellent clarity, no tendency to entrap bubbles and can be cured under lower intensity, long wave ultra-violet light. In addition, Dymax 489 showed the best adhesion to ACLAR 33C for the purposes of the present invention.

The assembled laminated structure is then treated to cure the adhesive. For example, in the preferred embodiment of the present invention with a LEXAN polycarbonate layer, an ACLAR 33C polychlorotrifluoroethylene film and a DYMAX light-weld ultraviolet cured adhesive, the assembled laminated structure was ultra-violet cured at 20-25 milliwatts/cm$^2$ for approximately 10 seconds. The result was a highly transparent laminated polycarbonate structure having excellent moisture barrier properties. This structure is particularly suitable for use as a cover for utility meter registers.

Figure 2:
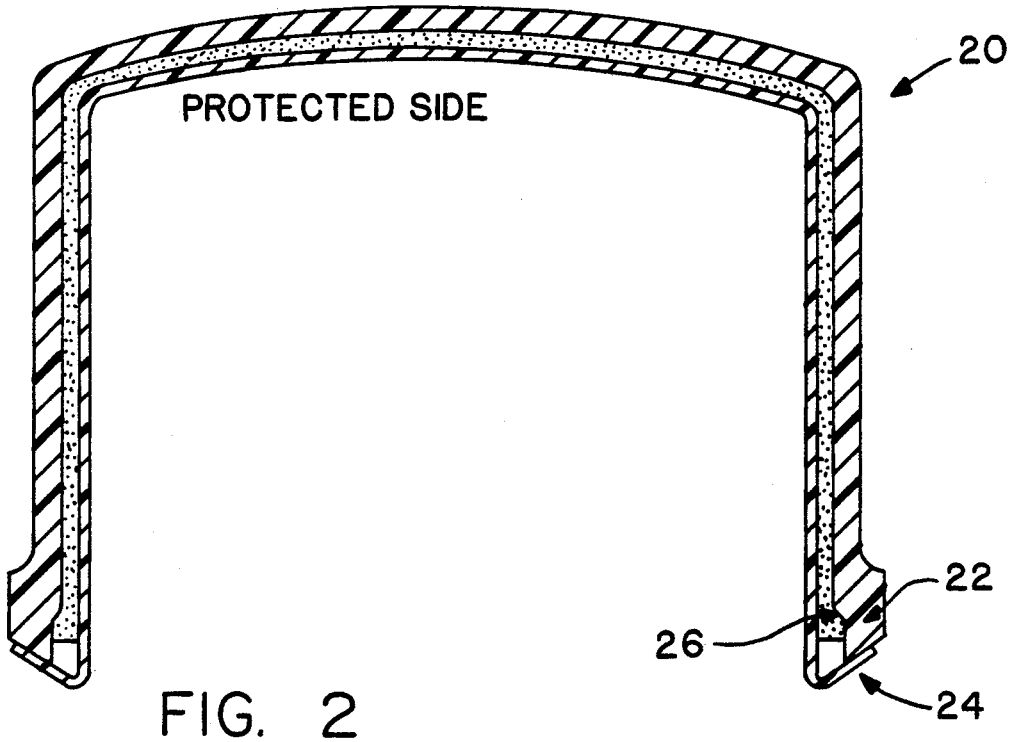
FIG. 2 is a cross-sectional view of the cover of the present invention.

A cover 20 for a water meter register is shown in cross-section in FIG. 2 In use, the internals of the register on the protected side of the cover 20 are isolated from the moisture-ridden environment by the cover 20 which is a plastic layer 22 bonded to a moisture resistant material layer 24 by an adhesive layer 26, preferably a UV-curable adhesive.

To produce the improved cover of the preferred embodiment of the present invention, a molded polycarbonate meter cover is formed in a conventional manner. The ACLAR 33C polychlorotrifluoroethylene film is vacuum thermoformed over a mold form, giving it a contour to match the interior of the polycarbonate cover. The vacuum thermoforming occurs at temperatures between 150°-200° C. for approximately 30 seconds in a known manner. A UV-curable adhesive, DYMAX 489 in the preferred embodiment, is placed on the interior of the polycarbonate cover. The polycarbonate cover and the thermoformed film are squeezed together, causing the adhesive to flow outward and fill the gap between the cover and the thermoformed PCTFE film. Ultraviolet light is then applied to cure the adhesive. The edges of the film are trimmed to correspond to that of the polycarbonate molding concurrently with the squeezing. This cover can be applied to standard, electronic utility meters to provide a product useful in all environments normally found with water meter registers, including high humidity environments. The improved register cover is sufficiently moisture-resistant to protect the electronic internals from moisture.

Figure 3:
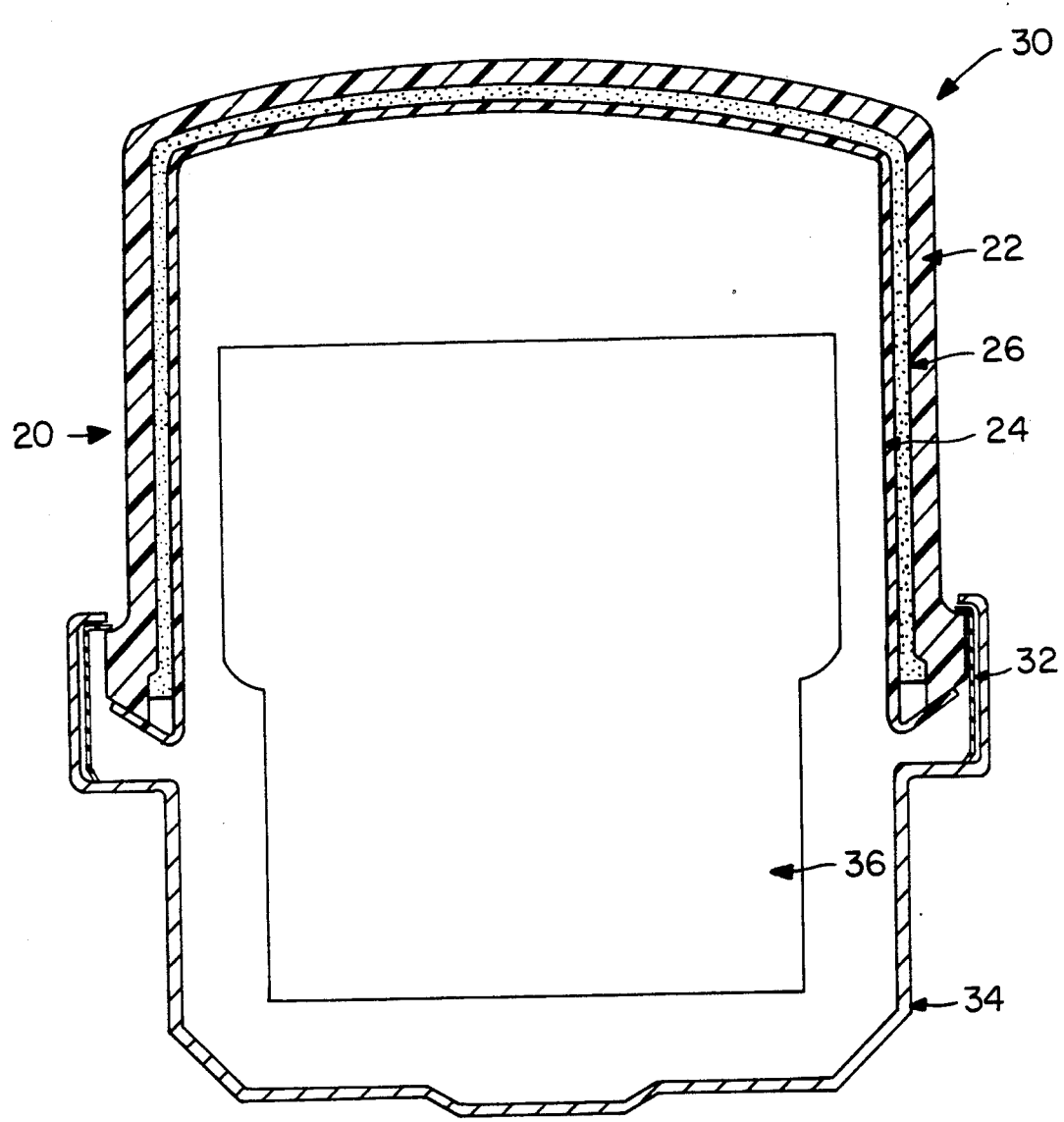
FIG. 3 is a cross-sectional view of a utility meter register employing a cover made according to the present invention.

The cover is shown in FIG. 3 on an electronic register assembly. The register assembly 30 differs from a standard electronic register in that it incorporates a formed polychlorotrifluoroethylene barrier film 24 as an inner liner on the cover. The polychlorotrifluoroethylene film 24 is bonded by cured adhesive 26 to the plastic register cover 22 and is captured by a rubber gasket 32 at the interface to the stainless cup 34 which forms the lower portion of the register assembly 30 containing the electronic internals 36 (shown in outline only). The protective seal formed by the joining of the improved cover 20 to the stainless cup 34 produces an enclosure which provides a moisture barrier to protect the electronic internals 36 from moisture, even in a high humidity environment.

It is to be understood that modifications may be made in the invention without departing from its spirit and purpose. Various modifications have been set forth and others will undoubtedly occur to one skilled in the art upon reading the specification, and consequently, it is not intended that the invention be limited other than the manner set forth in the claims below.

What is claimed is:

1. A process to produce a cover for a utility meter register comprising:
   providing a transparent thermoplastic or thermoset plastic cover;
   thermoforming a film of polychlorotrifluoroethylene over a mold form to give said film a contour to match a contour of said plastic cover;
   placing said plastic cover over said thermoformed polychlorotrifluoroethylene film;
   positioning a curable adhesive between said plastic cover and said thermoformed polychlorotrifluoroethylene film to form a laminate;
   squeezing the laminate; and
   simultaneously curing the adhesive and trimming any excess film from the peripheral edge of plastic cover, said laminate retaining its optical clarity upon curing of said adhesive.

2. The process of claim 1 wherein said plastic cover is a polycarbonate cover.

3. The process of claim 2 wherein said thermoforming of the polychlorotrifluoroethylene film is performed in a vacuum at 150°-200° for 30 seconds.

4. The, process of claim 2 wherein said adhesive is a polyurethane oligomer blend and the curing is performed under an ultraviolet light source.

* * * * *